Sept. 8, 1942.    C. E. FORD    2,294,973
FLUID TREATMENT DIFFUSER ELEMENT

Filed Feb. 2, 1940

INVENTOR
CURRY E. FORD
BY
ATTORNEY

Patented Sept. 8, 1942

2,294,973

UNITED STATES PATENT OFFICE 2,294,973

FLUID TREATMENT DIFFUSER ELEMENT

Curry E. Ford, Lakewood, Ohio, assignor to National Carbon Company, Inc., a corporation of New York Application February 2, 1940, Serial No. 316,928

1 Claim. (Cl. 261—122)

The operation of distributing a gas in the form of small bubbles in a body of liquid is used in numerous arts, notably including the art of treating sewage by the activated sludge process. One step in the activated sludge treatment of sewage consists in bubbling air through a tank of dilute sewage liquid, the air serving to supply oxygen for purification and to aid in stirring and circulating the liquid within the tank.

In order to minimize the cost of pumping air, and the size of the treating tank and time of treatment required to produce an acceptable degree of purity of products, it is important that the air be introduced in a form adapted for rapid purifying action, and that as large a part of the air as possible shall do useful work. To achieve these results it is desirable that the air be introduced as a cloud or swarm of bubbles, substantially uniform in size and very small.

Although perforated pipes and plates have been used as distributors of air, they have been largely supplanted by porous distributors, made of ceramic material or carbon, which are much better adapted for producing numerous small bubbles. Such porous distributors are commonly called "diffusers."

One of the most widely used types of air diffusers comprises a series of porous rectangular plates fastened end to end in the top of a trough formed at the bottom of the treating tank, the trough being used as an air conduit and air supply manifold. Three outstanding shortcomings of this type are, first, the difficulty of replacing broken or plugged plates, second, the difficulty of maintaining the seals and clamps necessarily used to hold the plates in position, and third, the fact that cleaning or replacement of plates requires that the tank be emptied and that workmen enter the empty but still odorous tank, a job so unpleasant and expensive that it is usually put off until the distributing system is nearly inoperative, long after its efficiency has dropped well below the maximum.

More recently, it has been proposed to use diffusers consisting of a number of separate units or elements, each element being a porous conduit adapted to be positioned above the bottom of the tank and readily removed from the tank for inspection, cleaning, repair, or replacement. These individual diffuser elements avoid the disadvantages just described, and it is to such diffuser elements that the present invention relates.

The diffuser elements heretofore used are elongated tubes, in cross-section usually circular, oval, or "teardrop," and porous over most of the periphery, including the portion intended to face the bottom of the tank. One disadvantage of such tubes is that they are not well adapted to withstand shocks and are therefore likely to be broken if carelessly handled. I have further observed that the bubbles of air issuing from the bottom of such a diffuser element tend to coalesce to form relatively large, and therefore relatively ineffective, bubbles.

An object of this invention is to provide a new and improved diffuser element which is strong, efficient in action, and relatively simple and inexpensive to manufacture.

This, and other objects of the invention, which will become evident as the following description proceeds, are achieved in a novel diffuser element comprising a conduit provided with a substantially flat porous top portion and an impervious body portion in the shape of a channel, as more particularly described below with reference to the drawing, in which—

Figure 1:
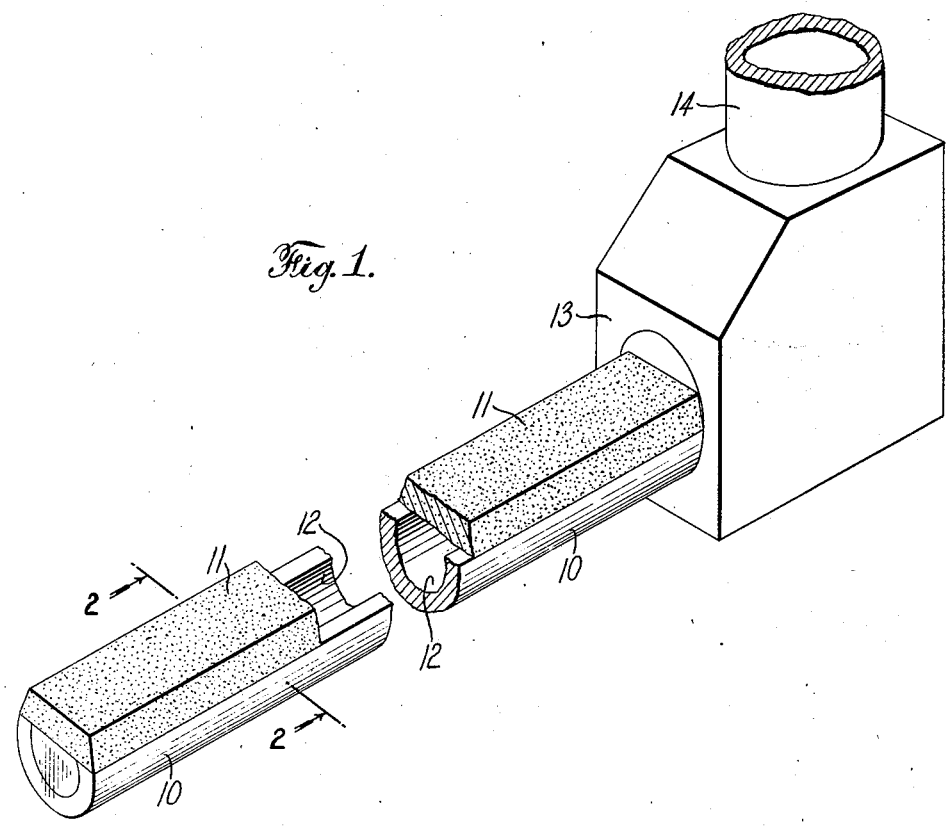
Fig. 1 is a perspective view of a typical diffuser element embodying the invention, together with certain attachments auxiliary thereto, a portion of the element being broken away.

As shown in the drawing, the diffuser element of the invention comprises an elongated channel 10 of impervious carbon, and a porous carbon, substantially flat top portion 11 which is cemented only by a fluid-impervious cement to the tops of the ends of the legs of the channel portion 10. The channel portion 10 is so shaped as to provide an air conduit or manifold space 12 and the porous portion 11 has inwardly sloping sides. One end 13 of the diffuser element is closed and the other is adapted to be supported by a suitable fixture 13 which also serves to connect the manifold space 12 to an air feed pipe 14. The invention is not limited, however, to the use of any particular end support or fixture, as many suitable types can readily be devised.

Figure 2:
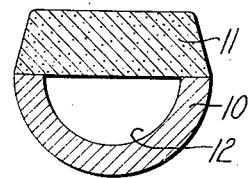
Fig. 2 is a cross-section taken on the plane of the line 2—2 of Fig. 1.
Figure 3:
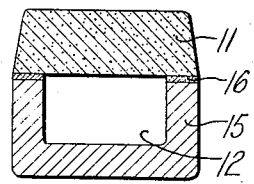
Fig. 3 is a cross-section of a modified form of the diffuser element shown in Figs. 1 and 2.

The channel portion 10 is preferably rounded, e. g. of semi-circular cross-section as illustrated in Fig. 1 and Fig. 2; but it may be of another shape, for instance rectangular as illustrated (15) in Fig. 3.

The porous carbon top portion 11 may be made of any suitable porous material, such as graphite or other form of carbon, and it should be flat or substantially so. When desired, the top portion may comprise a plurality of abutting porous elements, in either end-to-end or side-by-side arrangement, in which arrangement it is preferred that the abutting edges be cemented or otherwise sealed to avoid relatively large crevices therebetween. In this manner, extensive diffuser portions may be built up from smaller, more economical pieces of porous material.

In a preferred embodiment of the invention, the porous portion 11 is composed principally of carbon, fabricated for instance as described in Patent 1,988,475, B. E. Broadwell and L. C. Werking, and the portion 10 is also composed principally of carbon but of a variety of carbon which under the conditions of use is entirely or practically impermeable. It is also preferred that the two carbon portions be united by a fluid impervious cement 16, suitably by such a cement as that described in Patent 2,174,886, E. F. Kiefer.

If desired, a series of diffuser elements, each including a top portion and a body portion, may be joined end-to-end, intermediate elements, of course, being open at both ends.

In use, the diffuser is submerged in a liquid in such a manner that the flat top of the porous portion 11 is substantially horizontal. In this position the air introduced through the manifold space 12 distributes itself uniformly over the inner surface of the porous portion 11 and, since it passes through the same thickness of porous material at all points on the porous portion 11 and is subjected to the same liquid head at all such points, it forms a swarm or cloud of uniformly sized and distributed bubbles which are extremely well adapted for rapid and efficient action.

The strong and rigid channel portion 10 provides a firm support for the porous section, thereby minimizing the danger of breakage.

The diffuser element of the invention, comprising as it does a relatively strong channel portion which supports the inherently weaker porous portion, may be made and used in lengths considerably greater than would be practical were the entire diffuser porous. Moreover, since no bubbles of air are delivered from the bottom of the element, this source of large bubbles is eliminated. Further, the flat surface of the porous section is relatively easy to clean without damage to the element.

In order to increase the clarity and conciseness of the description of the invention, but a single example of its use has been stressed, the use for distributing air in the activated sludge process of treating sewage. It will readily be apparent that the diffuser element of the invention is adapted for use in many other processes wherein gas is to be introduced in the form of fine bubbles in a liquid, for instance to stir the liquid or to promote chemical reaction or or for both purposes. Therefore, the foregoing description of a diffuser element for use in sewage treatment is illustrative rather than limiting.

I claim:

A gas diffuser element comprising an elongated impervious preformed carbon channel portion and an elongated substantially flat porous carbon portion of substantial thickness united, only by a fluid impervious cement, at but one surface of the porous portion, to the tops of the ends of the legs of the channel portion to form a conduit; said porous portion having inwardly sloping sides and being entirely outside of, and extending substantially to the outer edges of the said channel portion, whereby both the flat top and the sloping sides of the porous portion are exposed to permit them to function as diffuser surfaces, and a minimum part of the porous portion is covered by said cement.

CURRY E. FORD.